United States Patent [19]
Hirotani

[11] Patent Number: 6,086,632
[45] Date of Patent: Jul. 11, 2000

[54] REGISTER OPTIMIZING COMPILER USING COMMUTATIVE OPERATIONS

[75] Inventor: Yoshiaki Hirotani, Tokyo, Japan

[73] Assignee: NEC Corporation, Tokyo, Japan

[21] Appl. No.: 08/958,321

[22] Filed: Oct. 27, 1997

[30] Foreign Application Priority Data

Oct. 31, 1996 [JP] Japan ................................. 8-305918

[51] Int. Cl.⁷ ................................................ G06F 7/00
[52] U.S. Cl. ................................................ 717/5
[58] Field of Search ................... 395/705, 707, 395/708; 711/13, 19

[56] References Cited

U.S. PATENT DOCUMENTS

| | | | |
|---|---|---|---|
| 4,571,678 | 2/1986 | Chaitin | 395/707 |
| 4,656,582 | 4/1987 | Chaitin et al. | 395/707 |
| 4,777,588 | 10/1988 | Case et al. | 395/800.41 |
| 4,961,141 | 10/1990 | Hopkins et al. | 395/709 |
| 5,261,062 | 11/1993 | Sato | 395/705 |
| 5,339,428 | 8/1994 | Burmeister et al. | 395/707 |
| 5,367,684 | 11/1994 | Smith | 395/709 |
| 5,367,696 | 11/1994 | Abe | 395/705 |
| 5,530,866 | 6/1996 | Koblenz et al. | 395/708 |
| 5,586,323 | 12/1996 | Koizumi et al. | 395/705 |
| 5,774,730 | 6/1998 | Aizikowitz et al. | 395/709 |
| 5,790,862 | 8/1998 | Tanaka et al. | 395/705 |
| 5,828,886 | 10/1998 | Hayashi | 395/709 |
| 5,857,103 | 1/1999 | Grove | 395/705 |
| 5,890,000 | 3/1999 | Aizikowitz et al. | 395/709 |

OTHER PUBLICATIONS

David F. Bacon et al., "Compiler Transformations for High–Performance Computing", 26 ACM Computing Surveys 345–420, Dec. 1994.

Alfred V. Aho et al., Compilers: Principles, Techniques, and Tools, 517–19, 541–46, 565–67, 1986.

Steven S. Muchnick, Advanced Compiler Design and Implementation, 333–43, Aug. 19, 1997.

*Primary Examiner*—Tariq R. Hafiz
*Assistant Examiner*—Michael Pender
*Attorney, Agent, or Firm*—Young & Thompson

[57] ABSTRACT

A register optimizing compiler for use in a computer in which the type of a register for storing data to be used in each of a plurality of input operands is limited according to the location of each input operand in an intermediate text, includes an intermediate text creating part; an operand location relocating part; a register selecting part; and an object program creating part.

39 Claims, 9 Drawing Sheets

Fig. 4

$$T1 = A(R0) - B(R1) \quad \cdots (1)$$

$$T2 = B \quad * \quad A \quad \cdots (2)$$

Fig. 5

$$T1(R2) = A(R0) - B(R1) \quad \cdots (1)$$

$$T2(R3) = A(R0) * B(R1) \quad \cdots (2)$$

Fig. 6
PRIOR ART $$T1\,(R4) = A\,(R0) - B\,(R1) \quad \cdots (1)$$

$$A\,(R3) = A\,(R0) \quad \cdots (2-1)$$

$$B\,(R2) = B\,(R1) \quad \cdots (2-2)$$

$$T2\,(R5) = B\,(R2) * A\,(R3) \quad \cdots (2)$$

Fig. 7

$$T1 = A(R0) - B(R1) \quad \cdots (1)$$

$$T3 = B < T1 \quad \cdots (3)$$

Fig. 8

$$T1\,(R2) = A\,(R0) - B\,(R1) \quad \cdots (1)$$

$$T3\,(R3) = T1\,(R2) > B\,(R1) \quad \cdots (3)$$

Fig. 9
PRIOR ART $$T1(R3) = A(R0) - B(R1) \quad \cdots (1)$$

$$B(R2) = B(R1) \quad \cdots (3-1)$$

$$T3(R4) = B(R2) < T1(R3) \quad \cdots (3)$$

REGISTER OPTIMIZING COMPILER USING COMMUTATIVE OPERATIONS

BACKGROUND OF THE INVENTION

1. Field of the Invention

The present invention relates to a compiling apparatus, a compiling method and a recording medium storing a compiler which converts a source program into a plurality of intermediate texts, assigns a register to data (variables and constants) to be used by a plurality of operands included in each intermediate text, and converts an intermediate text string to which each register is already assigned into an object program.

More particularly, the present invention relates a register optimizing compiler which generates an intermediate text string for use in a computer in which the type of a register to be allocated to data which is used by each of a plurality of input operands in an intermediate text is limited according to the location of each input operand in the intermediate text.

2. Description of the Related Art

A method of reducing the number of inter-register transfer instructions which generate an object program, divide the object program into a plurality of blocks each of which is a part having one entry and one exit, and check the dependent relation of registers to be used in each block is disclosed in Japanese Patent Laid-Open Number Hei. 3-127229 (No. 127229/1991).

FIG. 6 shows an example of prior art applied to an intermediate text shown in FIG. 4 for register allocation in a computer in which even registers (R0, R2, R4, . . . ) are assigned to operand 1 of two input operands and odd registers (R1, R3, R5, . . . ) are assigned to operand 2 of said two input operands fixedly, and then an optional register is assigned to an output operand after registers are assigned to all the input operands.

In the subtraction text (1), a register R0 is assigned to the data A of the operand 1, and a register R1 is assigned to the data B of the operand 2.

In the multiplication text (2), since the data of the operand 1 is B, it is impossible to assign the register R0 which is already assigned to the data A of the operand 1 in the subtraction text (1) to the data B. Therefore, a register R2 is assigned to the data B of said operand 1. Similarly, a register R3 is assigned to the data A of the operand 2 of said multiplication text (2). A register R4 is assigned to data T1 of the output operand of the subtraction text (1), and a register R5 is assigned to data T2 of the output operand of the multiplication text (2).

As described above, since the registers are assigned to the subtraction text (1) and the multiplication text (2), it becomes necessary to insert a register transfer instruction (2-1) for the data A, and a register transfer instruction (2-2) for the data B between the subtraction text (1) and the multiplication text (2).

Similarly, FIG. 9 shows an example of prior art applied to an intermediate text shown in FIG. 7 for register allocation in a computer in which even registers (R0, R2, R4, . . . ) are assigned to operand 1 of two input operands and odd registers (R1, R3, R5, . . . ) are assigned to operand 2 of said two input operands fixedly, and then an optional register is assigned to an output operand after registers are assigned to all the input operands.

In the subtraction text (1), register R0 is assigned to the data A of the operand 1, and register R1 is assigned to the data B of the operand 2.

In the comparison text (3), since the data of the operand 1 is B, it is impossible to assign register R0 which is already assigned to the data A of the operand 1 in the subtraction text (1) to data B. Therefore, a register R2 is assigned to the data B of said operand 1. Similarly, a register R3 is assigned to the data T1 of the operand 2 of said comparison text (3). A register R3 is assigned to data T1 of the output operand of the subtraction text (1), and a register R4 is assigned to data T3 of the output operand of the comparison text (3).

As described above, since the registers are assigned to the subtraction text (1) and the comparison text (3), it becomes necessary to insert a register transfer instruction (3-1) for the data B between the subtraction text (1) and the comparison text (3).

As described above, it is impossible for the prior art to avoid the use of the register transfer instruction(s) in a computer in which the type of a register to be assigned to data to be used by each of a plurality of input operands is limited according to the location of each operand in an intermediate text.

SUMMARY AND OBJECTS OF THE INVENTION

An object of the present invention is to overcome some of the problems of the prior art.

The present invention includes a compiling apparatus for use in a computer in which a location-assignment class of a register for storing the data to be used in each of a plurality of input operands contained in each of a plurality of intermediate texts created by converting a source program is limited according to a location of each input operand of each intermediate text such that each location corresponds to a particular location-assignment class. The compiling apparatus includes an intermediate text creating part designed and constructed to create the plurality of intermediate texts by converting a source program; a register management table designed and constructed to store information regarding correspondence relations between data to be used in each input operand in each intermediate text and registers to be assigned to the data; an operand location relocating part operatively connected to the intermediate text creating part and to the register management table part and designed and constructed to determine if the type of inequality operation contained in each intermediate text should be changed based on the register management table information, and to change such operation if it is determined that it should be changed; a register selecting part operatively connected to the operand location relocating part and designed and constructed to assign a register to the data to be used in each input operand in each intermediate text after the completion of any relocation by the operand location relocating part, add information regarding the register to the intermediate text and at the same time store the information regarding correspondence relations between the data and the registers in the register management table.

The invention also includes an object program creating part operatively connected to the register selecting part designed and constructed to create an object program based on a plurality of intermediate texts to which the information regarding the information regarding was added by the register selecting part.

Another object of the invention is to provide a compiling apparatus which the operand location relocating part is designed and constructed to read the plurality of intermediate texts in an execution sequence; determine whether there exists a register which is already assigned to the data to be used in any of a plurality of input operands in the intermediate texts which were read sequentially with reference to the register management table; determine whether the register can be used at the location of the input operand in the intermediate text when it is determined that the register which is already assigned to the data exists; determine whether the register can be used by changing the type of an operation included in the intermediate text and by relocating the locations of a plurality of input operands included in the intermediate text when it is determined that the register cannot be used at the location of the input operand; and relocate the locations of the plurality of input operands included in the intermediate text when it is determined that the register can be used by changing the type of an operation included in the intermediate text and by relocating the locations of a plurality of input operands included in each intermediate text.

A still further object of the invention is to provide a compiling apparatus with a register selecting part which assigns a register which is already assigned to the data to be used in any of the plurality of input operands to the data as is; adds the information regarding the register to the intermediate text; and accommodates the information regarding correspondence relations between the data and the register in the register management table when the operand location relocating part changes the type of an operation included in the intermediate texts which were read sequentially and relocates the location of a plurality of input operands in the intermediate texts.

A further object of the invention is realized by a using a register selecting part designed and constructed to assign the register to the data as is, add the information regarding the register to the intermediate text and store the information regarding correspondence relations between the data and the register in the register management table when the operand location relocating part determines that there exists a register which is already assigned to the data to be used in any of a plurality of input operands in the intermediate texts which were read sequentially and determines that the register can be used at the location of the input operand in the intermediate text.

Yet another object of the present invention includes providing a register selecting path to assign a register which is not in use or a register which is not used frequently to the data, add the information regarding the register to the intermediate text and store the information regarding correspondence relations between the data and the register in the register management table when the operand location relocating part cannot assign a register which already stores the data to one of the data to be used in each input operand in the intermediate texts which were read sequentially.

A still further object of the invention is to provide a compiling with a register transfer text creating part to insert an intermediate text for storing the data in a register which is newly assigned by the register selecting part immediately before the intermediate text when the register selecting part assigns a register which is not in use or a register which is not used frequently to one of data to be used in each input operand in each intermediate text.

To fulfil a yet another aspect of the invention concerning the compiling apparatus, the register selecting part adds the information regarding a register which was assigned to data to be used by each input operand in all the intermediate texts to their intermediate texts; stores the information regarding correspondence relations between the data and the register in the register management table, and then read those intermediate texts in the reverse sequence of an execution sequence; assigns the register to the data as is and add the information regarding the register to the intermediate text when the information regarding correspondence relations between data and register with respect to data to be used in the output operand in the intermediate texts which were read sequentially was registered in the register management table; and assigns a register which is not in use or a register which is not used frequently to the data, add the information regarding the register to the intermediate text and store the information regarding correspondence relations between the data and the register in the register management table when the information regarding correspondence relations between data and register with respect to data to be used in the output operand in the intermediate texts which were read sequentially is not registered in the register management table.

Other objects and advantages of the invention will become apparent from the following disclosure and claims.

BRIEF DESCRIPTION OF THE DRAWINGS

The invention will be understood more fully from the detailed description given below and from the accompanying drawings of preferred embodiments of the invention, which, however, should not be considered as limiting the invention but are for explanation and understanding only.

FIG. 4 is an example of intermediate text strings to which a register is assigned in one embodiment of the present invention.

FIG. 5 is an example of intermediate text strings shown in FIG. 4 to which registers were assigned of the present invention.

FIG. 6 is an example of intermediate text strings shown in FIG. 4 to which registers were assigned according to prior art.

FIG. 7 is an example of intermediate text strings to which registers were assigned in one embodiment of the present invention.

FIG. 8 is an example of intermediate text strings shown in FIG. 7 to which registers were assigned of the present invention.

FIG. 9 is an example of intermediate text strings shown in FIG. 7 to which registers were assigned according to prior art.

Here, it should be noted that like reference numerals represent like elements throughout the disclosure.

DETAILED DESCRIPTION OF THE PREFERRED EMBODIMENTS

The embodiments of the present invention will be described below in detail with reference to the accompanying drawings.

Figure 1:
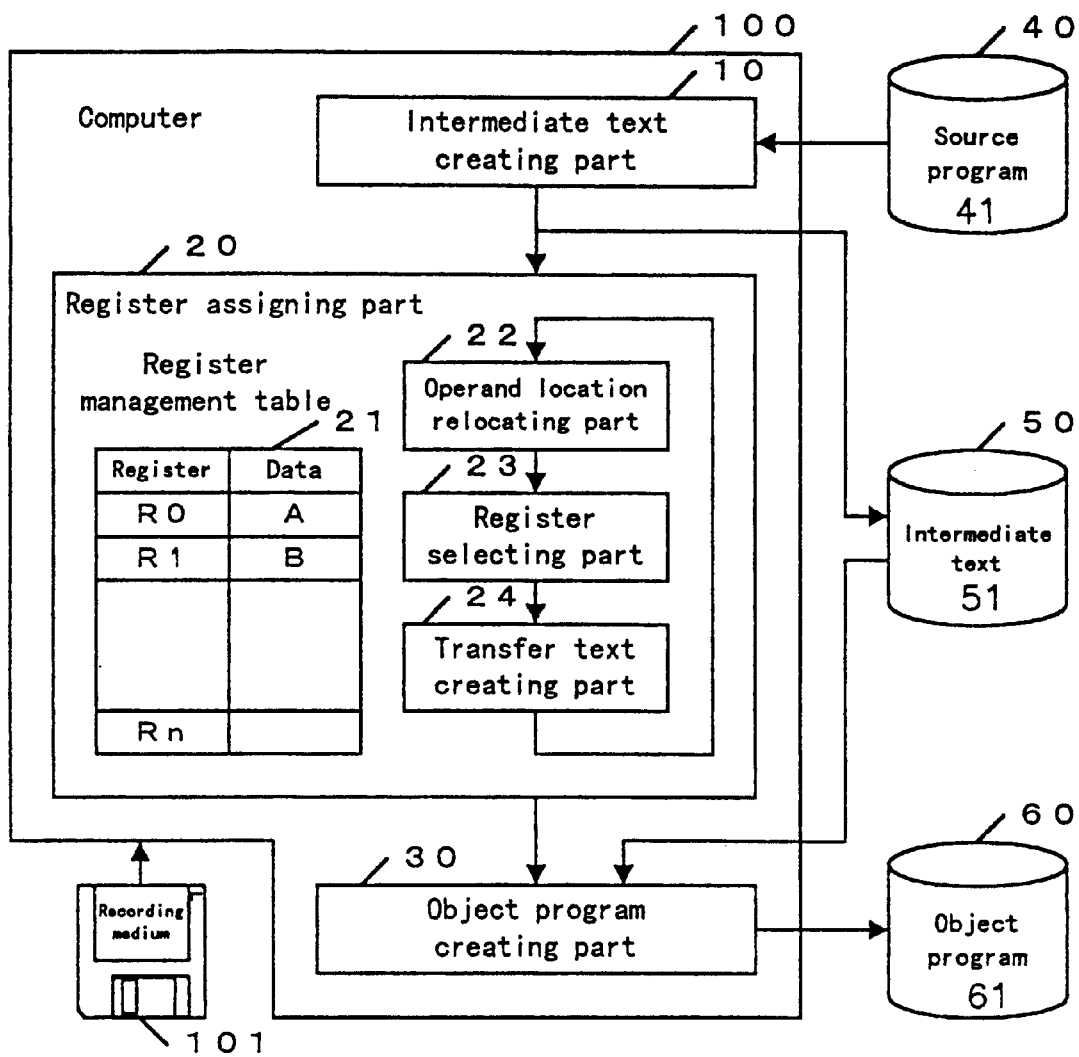
FIG. 1 is a block diagram of one embodiment of the present invention.

In FIG. 1, the first embodiment of the present invention comprises a program-controlled computer 100, storage devices 40, 50 and 60 connected with such computer 100.

The first embodiment may be so modified that said computer 100 can perform operations given below in such configuration in which a recording medium 101 such as a magnetic disk, a semiconductor memory, etc. is connected with the computer 100 and a program is read from said recording medium 101 to the computer 100.

The computer 100 comprises an intermediate text creating part 10 which reads a source program 41 stored in the storage device 40 and creates a plurality of intermediate texts 51 as an internal expression of the compiler and stores such intermediate texts in the storage device 50; a register assigning part 20 which creates register information to be used by each of a plurality of intermediate texts 51 stored in the storage device 50; and an object program creating part 30 which creates an object program 61 from a plurality of intermediate texts 51 and the register information created by the register assigning part 20 and stores such object program in the storage device 60. In the case of said computer 100, the type of a register, e.g., even or odd registers, to be assigned to data to be used by each of a plurality of input operands in the intermediate texts 51 is limited according to the location of each operand in said intermediate text 51.

The register assigning part 20 comprises a register management table 21 which contains assignment relations between data and registers in which said data is stored; an operand location relocating means 22 which relocates the operand locations and changes an operation for each of a plurality of intermediate texts 51 stored in the storage device 50; a register selecting part 23 which determines a register to be used in an operand in each intermediate text 51; and a register transfer text creating part 24 which creates a register transfer instruction.

The operand location relocating means 22 reads an intermediate text 51 from the storage device 50 and carries out the following actions to each of a plurality of input operands in the intermediate text 51.

First, reference is made to the register management table 21. If a register is already assigned to data to be used by at least one input operand in an intermediate text 51, it is checked whether said register can be assigned to data to be used by said input operand as is, taking the location of said input operand in the intermediate text 51 into consideration.

If registers which were already assigned to those data cannot be assigned to data which are used by all the input operands in the intermediate texts 51, and if an operation of said intermediate text is a commutative operation, it is checked whether a register which is now assigned to data to be used by at least one input operand in said intermediate text 51 can be assigned by relocating the location of each input operand. If it is possible, the location of each input operand is relocated. The example of a commutative operation is an addition and a multiplication. For example, the operands A and B in a multiplication text X=A×B can be replaced as X=B×A.

If a register which is already assigned to data to be used by all the input operands in an intermediate text 51 cannot be assigned to such data, and if an operation of said intermediate text is not a commutative operation, it is checked whether the location of each input operand can be relocated by changing the type of the operation. If it is possible to relocate the location of each input operand, the type of the operation is changed and the location of each input operand is relocated. For example, in the case of a comparison text in which two input operands are compared, namely, X=A>B, the locations of such two input operands can be replaced by changing X=A>B to X=B<A.

After the intermediate text 51 is converted by the operand location relocating part 22, the register selecting part 23 determines a register to be used to each input operand in said intermediate text 51, and adds such determination to said intermediate text 51. If data to be used by at least one input operand in said intermediate text 51 is registered in the register management table 21, and if a register which is now assigned to said data can be assigned to said data as is, the said register is assigned as is, and such assignment is added to said intermediate text 51. If a register is not yet assigned to data to be used by all the input operands in said intermediate text 51, and if a register registered in the register management table 21 cannot be assigned as is in the conversion of the intermediate text 51 by the operand location relocating part 22, an empty register to which no data is assigned and a register which is most infrequently used are assigned to data to be used by each input operand in the intermediate text 51, and the register management table 21 is updated.

The register transfer text creating part 24 shifts data from a predetermined register to other register or to a memory, if necessary, creates a text which is shifted from a memory to a register and inserts it in a location required. For example, if the register selecting part 23 cannot assign a register registered in the register management table 21 to data to be used by each input operand in the intermediate text 51 as is, the register transfer text creating part 24 creates a text to shift data stored in a register registered in said register management table 21 to a new register to be assigned to each input operand in said intermediate text 51, and inserts such text in a location before said intermediate text 51.

If data to be used by an output operand in said intermediate text 51 is used as an input operand in an intermediate text after the said intermediate text 51, and if different registers are assigned to data to be used by said output operand and data to be used by said input operand in the assignment process for assigning a register to data to be used by the output operand in the intermediate text 51, the register transfer text creating part 24 creates a text to shift data stored in a register which was assigned to said output operand to a register assigned to said input operand, and inserts such text in a location before an intermediate text containing said input operand.

The whole operation of the present invention will be described in detail with reference to FIGS. 1–9.

In the case of the computer which uses an object program created by the present embodiment, a usable register for the location of an input operand is limited to a part of all the registers in such computer because of the format of its mechanical language. For example, in the case of an addition text C=A+B in which two data A and B are added together and a resulting value is placed in another variable C, namely, in the case of an intermediate text in which two input operands (an operand 1 and an operand 2) use data A and B, and the output operand (a operand 3) uses the variable C, the assignment of even and odd registers depends on whether the input data A and B are used as the operand 1 or the operand 2 or not.

Figure 2:
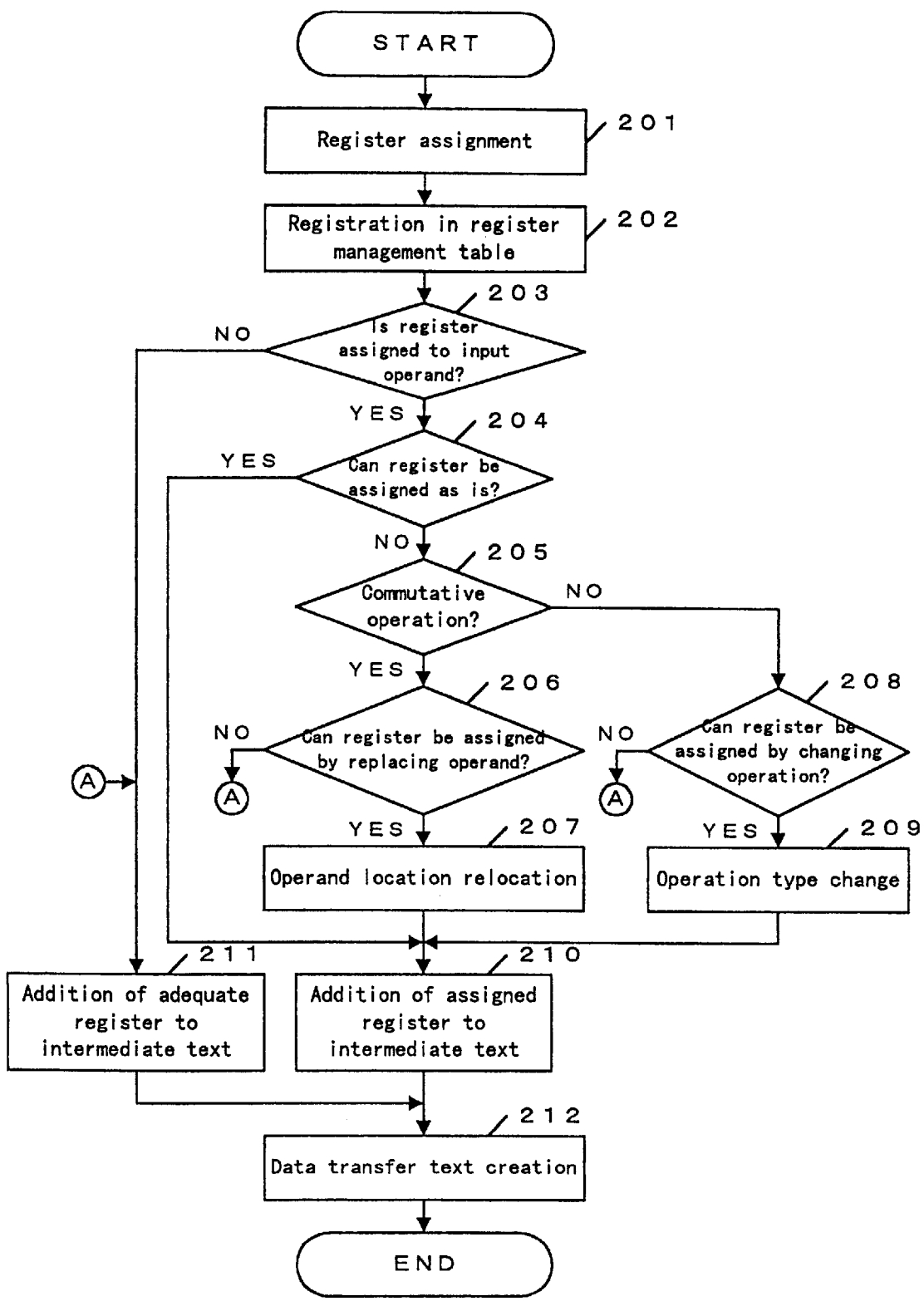
FIG. 2 is a flowchart of the operation of register assignment process to an input operand in one embodiment of the present invention.
Figure 3:
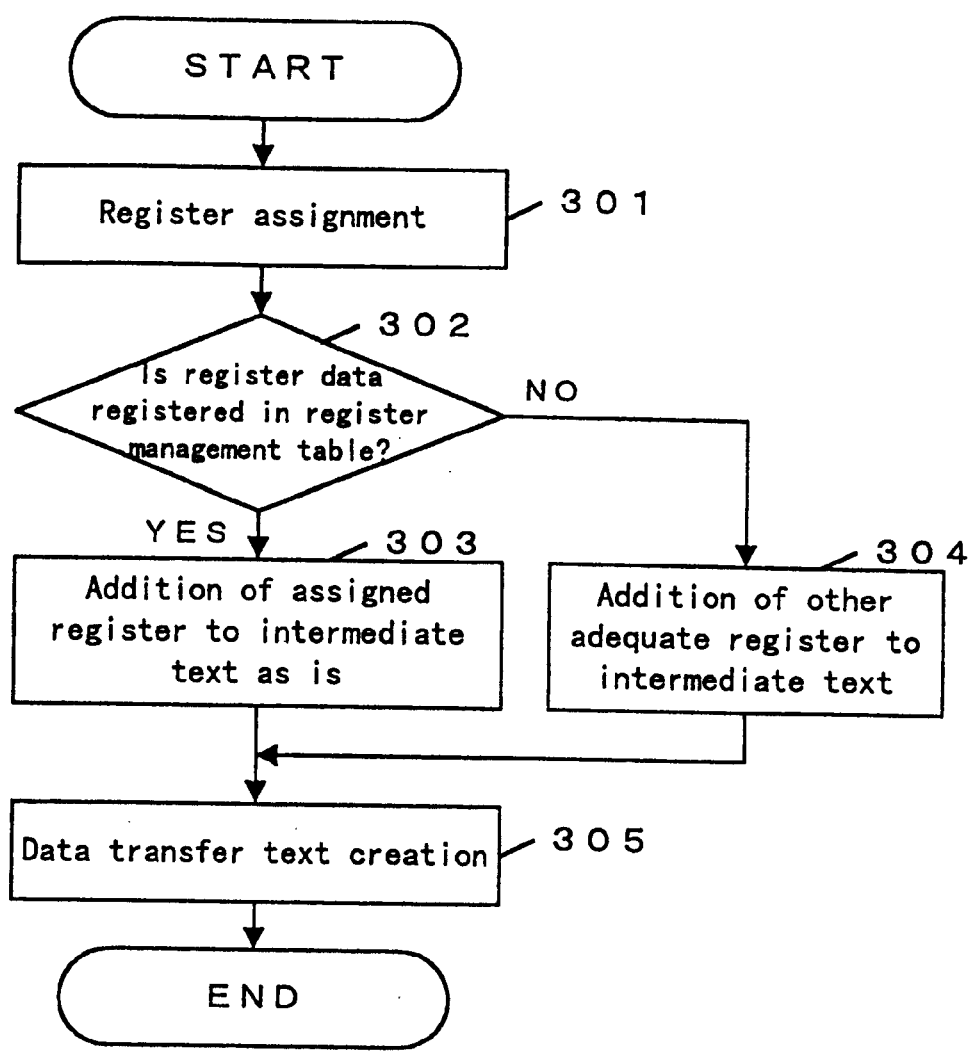
FIG. 3 is a flowchart of the operation of register assignment process to an output operand in one embodiment of the present invention.

The register assignment is illustrated as: the register assignment to the input operand as shown in FIG. 2, and the register assignment to the output operand as shown in FIG. 3.

In the former case, each intermediate text 51 created by the intermediate text creating part 10 is read in an execution sequence. Registers are assigned to data (variables and constants) used as the input operand in said intermediate text 51 (see step 201 in FIG. 2). Data to which registers are assigned are registered in the register management table 21

(step 202). For example, the register management table in FIG. 1 shows the register assignment for the intermediate text 51 given below.

$$X=A(R0)+B(R1)$$

where A and B are data to be used as an input operand, X is a variable of the output operand, and R0 and R1 in the parentheses are registers assigned to each input operand. Each time a register is assigned to each datum, such assignment is added to the register management table 21 and such table is updated. If data (a variable) to be used by the output operand is registered in register management table 21 at this time, a register assigned to said output operand becomes invalid (empty).

The operand location relocating part 22 checks if it is possible to assign a register registered on the register management table to data to be used by the input operand in the intermediate text 51 as is (step 203, 204). If it is impossible to assign a register registered in the register management table 21 to data to be used by the input operand in the intermediate text 51, and if an operation in said intermediate text 51 is a commutative operation, it is checked whether there exists a register which can be assigned by relocating the location of the input operand (step 205, 206). If such register which can be assigned exists, the locations of the input operands in said intermediate text 51 are relocated (step 207). If the operation in said intermediate text 51 is not a commutative operation, and if the locations of the input operands can be relocated by changing the type of said operation, and if a register registered in the register management table 21 can be assigned (step 208), the locations of the input operands are relocated by changing the type of said operation (step 209).

Next, the register selecting part 23 adds a register assigned to the intermediate text 51 to said intermediate text 51 (step 210). For an intermediate text 51 to which a register could not be assigned, an adequate register is selected and assigned to said intermediate text 51, and the register management table is updated (step 211).

Finally, the register transfer text creating part 24 creates a text to transfer data between the registers to an intermediate text 51 to which a register could not be assigned (step 212).

Next, in the assignment of a register to data to be used by the output operand, each intermediate text is taken out in the reverse sequence of an execution sequence, and registers are sequentially assigned to the data which are used as the output operand in the text (step 301 in FIG. 3). In this case, registers are assigned to data to be used by the output operand with reference to the register management table 21 in which the assignment of the registers to data to be used by the input operands is stored. If data which is used by the output operand is registered in the register management table 21, said register is deleted from the register management table 21 and it becomes invalid.

If the data to be used by the output operand is registered in the register management table 21, a register assigned to said data is selected as is (step 302, 303). If said data is not registered in the register management table 21, other adequate register (an empty register or a register which is not frequently referenced) is selected (step 302, 304). If an adequate register is selected for the output operand, and if it is found that said data is used as an input operand in a posterior text in the intermediate text taking-out process in the reverse sequence of an execution sequence, the register transfer text creating part 24 creates a text to shift the data from a register assigned to said output operand to a register which is assigned to said input operand to a memory in order to use said data in said input operand, and inserts such text in a location before an intermediate text containing said input operand (step 305).

An exemplary operation of the present embodiment will be described below with reference to an actual text.

It is assumed that a computer is used in which registers are classified into two location assignment classes, that is a first class in which even registers (R0, R2, R4, . . . ) are fixedly assigned to the data to be used by the operand 1 of the input operands, and a second class in which odd registers (R1, R3, R5, . . . ) are fixedly assigned to the data to be used by the operand 2 of the input operands, and optional register is assigned to the data to be used by the output operand.

FIG. 4 shows an example of an intermediate text string to be assigned to registers created by the intermediate text creating part 10. Each instruction text is a subtraction text and a multiplication text containing two input operands and one output operand. The register in the parentheses is a selected register.

That is, the registers R0 and R1 are assigned respectively to data to be used in the operands 1 and 2 as the input operands of the subtraction text (1). Data A and B to be used by the operands 1 and 2 as the input operands of the multiplication text (2) which is a commutative operation which must use the registers R0 and R1 assigned to the data A and B in the subtraction text (1). So to accommodate the use of registers R0 and R1, the locations of the operands 1 and 2 are relocated by the operand location relocating part 22.

FIG. 5 is the intermediate text string shown in FIG. 4 which was relocated by the operand location relocating part 22 and to which registers were assigned. As compared with the intermediate text string created by prior art shown in FIG. 6, the intermediate text string described above is an efficient object program which uses less registers and contains less intermediate texts.

Figure 7:
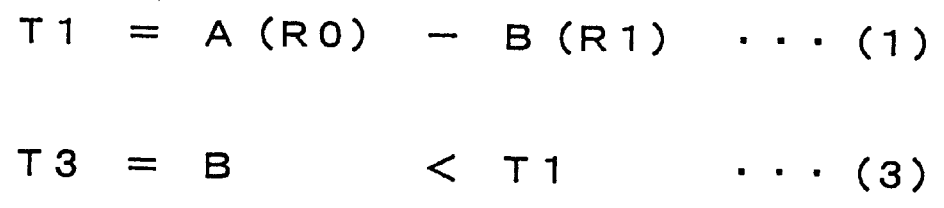

FIG. 7 is an example of an intermediate text string created by the intermediate text creating part 10 to which registers are assigned. Instruction text (1) is a subtraction text whereas instruction text (2) is a comparison text. Each contain two input operands and one output operand. The registers in the parentheses are the selected registers.

That is, the registers R0 and R1 are assigned respectively to the data to be used by the operands 1 and 2 as the input operands of the subtraction text (1). Data B to be used by the operands 1 and 2 as the input operands of the comparison text (2) which is a commutative operation which must use the registers R0 and R1 assigned to data A and B in the subtraction text (1). So to accommodate this, the operation is to be changed and the locations of the operands 1 and 2 are to be relocated by the operand location relocating part 22.

A register to the output operand is determined after assigning registers to the input operands. For example, with is reference to the register management table 21, one can see that the register assigned to the data T1 to be used by the output operand of the subtraction text (1) may be R2, which register R2 may also be assigned to T1 in the subsequent text (the comparison text (3)). Therefore, the register R2 is assigned to said data T1 so as to reuse the data T1 calculated in the subtraction text (1). Note also that the inequality is changed so as to permit 122 (an even register) be operand 1 of the input operands.

FIG. 8 is the intermediate text string shown in FIG. 7 which was relocated by the operand location relocating part 22 and to which registers were assigned. As compared with the intermediate text string created by prior art shown in FIG. 9, the intermediate text string described above is a more efficient object program which uses fewer registers and contains less intermediate texts.

The present invention has been described with reference to the preferred embodiments. However, the present invention is not limited by those preferred embodiments.

As described above, the present invention has an advantage that it can create an object program with high execution efficiency by using registers efficiently and by creating intermediate texts which limit register transfer instructions as much as possible. As can be seen from the above, the invention is most suitable in a computer in which the type of the register to be assigned to the location of each operand to be used each of a plurality of input operands in the intermediate text is limited according to the location of each operand in said intermediate text.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A compiling apparatus for use in a computer in which a location-assignment class of a register for storing the data to be used in each of a plurality of input operands contained in each of a plurality of intermediate texts created by converting a source program is limited according to a location of each input operand of each intermediate text such that each location corresponds to a particular assignment class, said compiling apparatus comprising:

an intermediate text creating part designed and constructed to create a plurality of intermediate texts by converting a source program;

a register assignment part operatively connected to said intermediate text creating part, and comprising a register management table designed and constructed to store information regarding correspondence relations between data to be used in each input operand in each intermediate text and registers to be assigned to said data, an operand location relocating part operatively connected to said register management table and designed and constructed to determine if the location of each input operand in each intermediate text should be relocated, and to relocate such input operand locations if it is determined that they should be relocated, and a register selecting part operatively connected to said operand relocation relocating part and designed and constructed to assign a register to data to be used in each input operand in each intermediate text after the completion of the relocation by said operand location relocating part, add the information regarding said registers to said intermediate texts and at the same time store the information regarding correspondence relations between said data and said registers in said register management table; and an object program creating part operatively connected to said register assignment part and designed and constructed to create an object program based on a plurality of intermediate texts to which the information regarding the register is added by said register selecting part, wherein said operand location relocating part is designed and constructed to:

read said plurality of intermediate texts in an execution sequence;

determine whether there exists a register which is already assigned to the data to be used in any of a plurality of input operands in the intermediate texts which were read sequentially with reference to said register management table;

determine whether said register can be used at the location of said input operand in said intermediate text when it is determined that said register which is already assigned to said data exists;

determine whether an operation included in said intermediate text is a commutative operation from the group consisting of addition, multiplication, and inequality operations and whether said register can be used by relocating the locations of a plurality of input operands included in said intermediate text when it is determined that said register cannot be used at the location of said input operand; and relocate the locations of those input operands when it is determined that said register can be used by relocating the locations of said plurality of input operands.

2. A compiling apparatus according to claim 1, wherein said register selecting part is designed and constructed to:

assign a register which is already assigned to data to be used in any of said plurality of input operands to said data as is;

add the information regarding said register to said intermediate text; and accommodate the information regarding correspondence relations between said data and said register in said register management table when said operand location relocating part relocates the locations of a plurality of input operands in the intermediate texts which were read sequentially.

3. A compiling apparatus according to claim 2, wherein said register selecting part is designed and constructed to:

assign said register to said data as is;

add the information regarding said register to said intermediate text; and accommodate the information regarding correspondence relations between said data and said register in said register management table when said operand location relocating part determines that there exists a register which already assigned to the data to be used in any of a plurality of input operands in the intermediate texts which were read sequentially and determines that said register can be used at the location of said input operand in said intermediate text.

4. A compiling apparatus according to claim 3, wherein said register selecting part is designed and constructed to:

assign a register which is not in use or a register which is not used frequently to said data;

add the information regarding said register to said intermediate text; and accommodate the information regarding correspondence relations between said data and said register in said register management table when said operand location relocating part cannot assign a register which already stores said data to one of the data to be used in each input operand in the intermediate texts which were read sequentially.

5. A compiling apparatus according to claim 4, comprising:
a register transfer text creating part designed and constructed to insert an intermediate text for storing said data in a register which is newly assigned by said register selecting part immediately before said intermediate text when said register selecting part assigns a register which is not in use or a register which is not used frequently to one of data to be used in each input operand in each intermediate text.

6. A compiling apparatus according to claim 5,
wherein said register selecting part is designed and constructed to
assign said register to said data as is, add the information regarding a register which was assigned to data to be used by each input operand in all the intermediate texts to their intermediate texts;
store the information regarding correspondence relations between said data and said register in said register management table and then read those intermediate texts in the reverse sequence of an execution sequence;
assign said register to said data as is and add the information regarding said register to said intermediate text when the information regarding correspondence relations between data and register with respect to data to be used in the output operand in the intermediate texts which were read sequentially was registered in said register management table;
assign a register which is not in use or a register which is not used frequently to said data, add the information regarding said register to said intermediate text and store the information regarding correspondence relations between said data and said register in said register management table when the information regarding correspondence relations between data and register with respect to data to be used in the output operand in the intermediate texts which were read sequentially is not registered in said register management table.

7. A compiling apparatus for use in a computer in which a location-assignment class of a register for storing the data to be used in each of a plurality of input operands contained in each of a plurality of intermediate texts created by converting a source program is limited according to a location of each input operand of each intermediate text such that each location corresponds to a particular location-assignment class, said compiling apparatus comprising:
an intermediate text creating part designed and constructed to create said plurality of intermediate texts by converting a source program;
a register management table designed and constructed to store information regarding correspondence relations between data to be used in each input operand in each intermediate text and registers to be assigned to said data;
an operand location relocating part operatively connected to said intermediate text creating part and to said register management table part and designed and constructed to determine if the type of inequality operation contained in each intermediate text should be changed based on the register management table information, and to change such operation if it is determined that it should be changed;
a register selecting part operatively connected to said operand location relocating part and designed and constructed to assign a register to the data to be used in each input operand in each intermediate text after the completion of any relocation by said operand location relocating part, add information regarding said register to said intermediate text and at the same time store the information regarding correspondence relations between said data and said registers in said register management table; and
an object program creating part operatively connected to said register selecting part designed and constructed to create an object program based on a plurality of intermediate texts to which the information regarding the information regarding was added by said register selecting part.

8. A compiling apparatus according to claim 7,
wherein said operand location relocating part is designed and constructed to:
read said plurality of intermediate texts in an execution sequence;
determine whether there exists a register which is already assigned to the data to be used in any of a plurality of input operands in the intermediate texts which were read sequentially with reference to said register management table;
determine whether said register can be used at the location of said input operand in said intermediate text when it is determined that said register which is already assigned to said data exists;
determine whether said register can be used by changing the type of an operation included in said intermediate text and by relocating the locations of a plurality of input operands included in said intermediate text when it is determined that said register cannot be used at the location of said input operand; and
relocate the locations of said plurality of input operands included in said intermediate text when it is determined that said register can be used by changing the type of an operation included in said intermediate text and by relocating the locations of a plurality of input operands included in each intermediate text.

9. A compiling apparatus according to claim 8,
wherein said register selecting part is designed and constructed to:
assign a register which is already assigned to the data to be used in any of said plurality of input operands to said data as is;
add the information regarding said register to said intermediate text; and
accommodate the information regarding correspondence relations between said data and said register in said register management table when said operand location relocating part changes the type of an operation included in the intermediate texts which were read sequentially and relocates the location of a plurality of input operands in said intermediate texts.

10. A compiling apparatus according to claim 9, wherein said register selecting part is designed and constructed to:
assign said register to said data as is, add the information regarding said register to said intermediate text and store the information regarding correspondence relations between said data and said register in said register management table when said operand location relocating part determines that there exists a register which is already assigned to the data to be used in any of a plurality of input operands in the intermediate texts which were read sequentially and determines that said register can be used at the location of said input operand in said intermediate text.

11. A compiling apparatus according to claim 10, wherein said register selecting path is designed and constructed to:
assign a register which is not in use or a register which is not used frequently to said data, add the information regarding said register to said intermediate text and store the information regarding correspondence relations between said data and said register in said register management table when said operand location relocating part cannot assign a register which already stores said data to one of the data to be used in each input operand in the intermediate texts which were read sequentially.

12. A compiling apparatus according to claim 11, comprising a register transfer text creating part designed and constructed to insert an intermediate text for storing said data in a register which is newly assigned by said register selecting part immediately before said intermediate text when said register selecting part assigns a register which is not in use or a register which is not used frequently to one of data to be used in each input operand in each intermediate text.

13. A compiling apparatus according to claim 12, wherein said register selecting part is designed and constructed to add:
the information regarding a register which was assigned to data to be used by each input operand in all the intermediate texts to their intermediate texts;
store the information regarding correspondence relations between said data and said register in said register management table, and then read those intermediate texts in the reverse sequence of an execution sequence;
assign said register to said data as is and add the information regarding said register to said intermediate text when the information regarding correspondence relations between data and register with respect to data to be used in the output operand in the intermediate texts which were read sequentially was registered in said register management table; and
assign a register which is not in use or a register which is not used frequently to said data, add the information regarding said register to said intermediate text and store the information regarding correspondence relations between said data and said register in said register management table when the information regarding correspondence relations between data and register with respect to data to be used in the output operand in the intermediate texts which were read sequentially is not registered in said register management table.

14. A compiling method for use in a computer in which the location-assignment class of a register for storing data to be used in each of a plurality of input operands contained in each of a plurality of intermediate texts created by converting a source program is limited according to a location of each input operand of each intermediate text so that each location corresponds to a particular location-assignment class, comprising:
an intermediate text creating step for creating a plurality of intermediate texts by converting said source program;
an operand location relocating step for determining if the location of each input operand in each intermediate text should be relocated, and for relocating such input operand location if it was determined that it should be relocated;

a register selecting step for assigning a register to data to be used in each input operand in each intermediate text after the completion of relocation in said operand location relocating step, adding the information regarding said register to said intermediate register and at the same time storing the information regarding correspondence relations between said data and said registers in said register management table; and
an object program creating step for creating an object program based on a Plurality of intermediate texts to which the information regarding the register was added in said register selecting step, wherein said operand location relocating step comprises:
reading said plurality of intermediate texts in an execution sequence;
determining whether there exists a register which is already assigned to the data to be used in any of a plurality of input operands in the intermediate texts which were read sequentially with reference to said register management table;
determining whether said register can be used at the location of said input operand in said intermediate text when it is determined that said register which is already assigned to said data exists;
determining whether an operation included in said intermediate text is one of an addition, multiplication and an inequality operation and whether said register can be used by relocating the locations of a plurality of input operands included in said intermediate text when it is determined that said register cannot be used at the location of said input operand;
relocating the locations of those input operands when it is determined that said register can be used by relocating the locations of said plurality of input operands.

15. A compiling method according to claim 14, wherein said register selecting step comprises:
assigning a register which is already assigned to the data to be used in any of said plurality of input operands to said data as is, adding the information regarding said register to said intermediate text and storing the information regarding correspondence relations between said data and said register in said register management table when the locations of a plurality of input operands in the intermediate texts which were read sequentially are changed in said operand location relocating step.

16. A compiling method according to claim 15, wherein said register selecting step comprises:
assigning said register to said data as is, adding the information regarding said register to said intermediate text and storing the information regarding correspondence relations between said data and said register in said register management table when it is determined that there exists a register which is already assigned to the data to be used in any of a plurality of input operands in the intermediate texts which were read sequentially and that said register can be used at the location of said input operand in said intermediate text in the said operand location relocating step.

17. A compiling method according to claim 16, wherein said register selecting step comprises:
assigning a register which is not in use or a register which is not used frequently to said data, adding the information regarding said register to said intermediate text and storing the information regarding correspondence relations between said data and said register in said register management table when a register which already stores said data cannot be assigned to the data to be used in each input operand in the intermediate texts which were read sequentially in said operand location relocating step.

18. A compiling method according to claim 17, comprising:
   a register transfer text creating step in which an intermediate text for storing said data in a register which is newly assigned in said register selecting step is inserted immediately before said intermediate text when a register which is not in use or a register which is not used frequently is assigned to any of data used in each input operand in each intermediate text in said register selecting step.

19. A compiling method according to claim 18, wherein said register selecting step comprises:
   adding the information regarding a register which was assigned to the data to be used by each input operand in all the intermediate texts to their intermediate texts, storing the information regarding correspondence relations between said data and said register in said register management table, and then reading those intermediate texts in the reverse sequence of an execution sequence; when the information regarding correspondence relations between data and register with respect to the data to be used in an output operand in the intermediate texts which were read sequentially was registered in said register management table, assigning said register to said data as is, and adding the information regarding said register to said intermediate text; when the information regarding correspondence relations between data and register with respect to data to be used in an output operand in the intermediate texts which were read sequentially is not registered in said register management table, assigning a register which is not in use or a register which is not used frequently to said data, adding the information regarding said register to said intermediate text and storing the information regarding correspondence relations between said data and said register in said register management table.

20. A compiling method for use in a computer in which a location-assignment class of a register for storing data to be used in each of a plurality of input operands contained in each of a plurality of intermediate texts created by converting a source program is limited according to a location of each input operand of each intermediate text so that each location corresponds to a particular location-assignment class, comprising:
   an intermediate text creating step for creating a plurality of intermediate texts by converting a source program;
   an operand location relocating step for determining if the location of each input operand in a particular intermediate text should be relocated and if the type of an inequality operation contained in each intermediate text should be changed as a result of such a relocation of input operands and changing such operation if it is determined it should be changed;
   a register selecting step for assigning a register to data to be used in each input operand in each intermediate text after the completion of any relocation in said operand location relocating step, adding the information regarding said register to said intermediate register and at the same time storing the information regarding correspondence relations between said data and said registers in said register management table; and
   an object program creating step for creating an object program based on a plurality of intermediate texts to which the information regarding registers was added in said register selecting step.

21. A compiling method according to claim 20, wherein said operand location relocating step comprises:
   reading said plurality of intermediate texts in an execution sequence; determining whether there exists a register which is already assigned to the data to be used in any of a plurality of input operands in the intermediate texts which were read sequentially with reference to said register management table;
   determining whether said register can be used at the location of said input operand included in said intermediate text when it is determined that said register which is already assigned to said data exists;
   determining whether said register can be used by changing the type of an inequality operation, from one of changing greater-than to less-than and changing less-than to greater-than, included in said intermediate text and by relocating the locations of a plurality of input operands included in said intermediate text when it is determined that said register cannot be used at the location of said input operand; and
   changing the type of an operation, from one of changing greater-than to less-than and changing less-than to greater-than, included in said intermediate text and relocating the locations of said plurality of input operands included in said intermediate text when it is determined that said register can be used by changing the type of an operation included in said intermediate text and by relocating the locations of said plurality of input operands included in said intermediate text.

22. A compiling method according to claim 21, wherein said register selecting step comprises:
   assigning a register which is already assigned to the data to be used in any of said plurality of input operands to said data as is, adding the information regarding said register to said intermediate text and storing the information regarding correspondence relations between said data and said register in said register management table when the type of an inequality operation included in the intermediate texts which are already read sequentially was changed, from one of changing greater-than to less-than and changing less-than to greater-than, and the locations of a plurality of input operands in said intermediate text were changed in said operand location relocating step.

23. A compiling method according to claim 22, wherein said register selecting step comprises:
   assigning said register to said data as is, adding the information regarding said register to said intermediate text and storing the information regarding correspondence relations between said data and said register in said register management table when it is determined that there exists a register which is already assigned to data to be used in any of a plurality of input operands in the intermediate texts which were read sequentially and that said register can be used at the location of said input operand in said intermediate text in said operand location relocating step.

24. A compiling method according to claim 23, wherein said register selecting step comprises:
   assigning a register which is not in use or a register which is not used frequently to said data, adding the information regarding said register to said intermediate text and storing the information regarding correspondence relations between said data and said register in said register management table when a register which already stores said data cannot be assigned to the data to be used in each input operand in the intermediate texts which were read sequentially in said operand location relocating step.

25. A compiling method according to claim 24, comprising:

a register transfer text creating step in which an intermediate text for storing said data in a register which is newly assigned in said register selecting step is inserted immediately before said intermediate text when a register which is not in use or a register which is not used frequently is assigned to one of the data to be used in each input operand in each intermediate text in said register selecting step.

26. A compiling method according to claim 25, wherein said register selecting step comprises:

adding the information regarding a register which was assigned to the data to be used by each input operand in all the intermediate texts to their intermediate texts, storing the information regarding correspondence relations between said data and said register in said register management table, and then reading those intermediate texts in the reverse sequence of an execution sequence; when the information regarding correspondence relations between data and register with respect to data to be used in an output operand in the intermediate tests which were read sequentially was registered in said register management table, assigning said register to said data as is, adding the information regarding said register to said intermediate text; when the information regarding correspondence relations between data and register with respect to data to be used in an output operand in the intermediate tests which were read sequentially is not registered in said register management table, assigning a register which is not in use or a register which is not used frequently to said data, adding the information regarding said register to said intermediate text and storing the information regarding correspondence relations between said data and said register in said register management table.

27. A recording medium for use in a computer in which a location-assignment class of a register for storing data to be used in each of a plurality of input operands contained in each of a plurality of intermediate texts created by converting a source program is limited according to a location of each input operand in each intermediate text such that each location corresponds to a particular location-assignment class, in which a program is stored, said program causing a computer to execute:

an intermediate text creating step for creating said plurality of intermediate texts by converting said source program;

an operand location relocating step for determining the necessity of the relocation of the location of each operand in each intermediate text and relocating their input operand locations if it is determined that the relocation should be made;

a register selecting step for assigning a register to data to be used in each input operand in each intermediate text, adding the information regarding said register to said intermediate text and storing the information regarding correspondence relations between said data and said registers in a register management table after the completion of said operand locations relocating step; and an object program creating step for creating an object program based on a plurality of intermediate texts to which the information regarding the register was added in said register selecting step, wherein said operand location relocating step comprises:

reading said plurality of intermediate texts in an execution sequence;

determining the existence of a register which is already assigned to data to be used in any of a plurality of input operands in the intermediate texts which were read sequentially with reference to said register management table;

determining usability of said register at the location of said input operand in said intermediate text when it is determined that a register which is already assigned to said data exists;

determining that an operation included in said intermediate text is one of an addition, multiplication and inequality operation and determining usability of said register by relocating the locations of a plurality of input operands included in said intermediate text when it is determined that said register cannot be used in the location of said input operand; and changing the locations of the input operands when it is determined that said register can be used by relocating the locations of said plurality of input operands.

28. A program recorded on a recording medium according to claim 27, wherein said register selecting step comprises:

assigning a register which is already assigned to data to be used in any of said plurality of input operands to said data as is;

adding the information regarding said register to said intermediate text; and storing the information regarding correspondence relations between said data and said register in said register management table when the locations of a plurality of input operands in the intermediate texts which were read sequentially were relocated in said operand location relocating step.

29. A recording medium for use in a computer in which a location-assignment class of a register for storing data to be used in each of a plurality of input operands contained in each of a plurality of intermediate texts created by converting a source program is limited according to a location of each input operand in each intermediate text such that each location corresponds to a particular location-assignment class, in which a program is stored, said program causing a computer to execute:

an intermediate text creating step for creating said plurality of intermediate texts by converting said source program;

determining the necessity of the change of the type of an inequality operation, from one of changing greater-than to less-than and changing less-than to greater-than, included in each intermediate text and relocating the location of an operand where the type of the operation, from one of changing greater-than to less-than and changing less-than to greater-than, is changed, if it was determined that the relocation should be made;

assigning a register to the data to be used in each input operand in each intermediate text, adding the information regarding said register to said intermediate text and storing the information regarding correspondence relations between said data and said register in a register management table after the completion of said operand location relocating step; and an object program creating step for creating an object program based on a plurality of intermediate texts to which the information regarding the register was added in said register selecting step.

30. A program recorded on a recording medium according to claim 29, wherein said operand location relocating step comprises:

reading said plurality of intermediate texts in an execution sequence;

determining the existence of a register which is already assigned to data to be used in any of a plurality of input operands in the intermediate texts which were read sequentially with reference to said register management table;

determining usability of said register at the location of said input operand in said intermediate text when it is determined that a register which is already assigned to said data exists; determination of usability of said register by changing the type of an inequality operation, from one of changing greater-than to less-than and changing less-than to greater-than, included in said intermediate text arid by relocating the locations of a plurality of input operands included in said intermediate text when it is determined that said register cannot be used at the location of said input operand; and changing the type of an operation, from one of changing greater-than to less-than and changing less-than to greater-than, included in said intermediate text and relocating the locations of such input operands included in said intermediate text when it is determined that said register can be used by changing the type of an operation included in said intermediate text and by relocating the locations of a plurality of input operands included in said intermediate text.

31. A program recorded on a recording medium according to claim 30, wherein said register selecting step comprises:

assigning a register which is already assigned to data to be used in any of said plurality of input operands to said data as is;

adding the information regarding said register to said intermediate text and storing the information regarding correspondence relations between said data and said register in said register management table when the type of an operation included in the intermediate texts which were read sequentially was changed and the locations of a plurality of input operands in said intermediate texts were relocated in said operand location relocating step.

32. A program recorded on a recording medium according to claim 31, wherein said register selecting step comprises:

assigning said register to said data as is, adding the information regarding said register to said intermediate text and storing the information regarding correspondence relations between said data and said register in said register management table when it is determined that there exists a register which is already assigned to the data to be used in any of a plurality of input operands in the intermediate texts which were read sequentially and that said register can be used in the location of said input operand in said intermediate text in said operand location relocating step.

33. A program recorded on a recording medium according to claim 32, wherein said register selecting step comprises:

assigning a register which is not in use or a register which is not used frequently to said data, adding the information regarding said register to said intermediate text and storing the information regarding correspondence relations between said data and said register in said register management table when a register which already stores said data cannot be assigned to one of data to be used in each input operand in the intermediate texts which were read sequentially in said operand location relocating step.

34. A recording medium according to claim 33, said program further causing said computer to execute:

a register transfer text creating step for inserting an intermediate text for storing said data in a register which is newly assigned in said register selecting step immediately before said intermediate text when a register which is not in use or a register which is not used frequently is assigned to any of the data to be used in each input operand in each intermediate text in said register selecting step.

35. A program recorded on a recording medium according to claim 34, wherein said register selecting step comprises:

adding the information regarding a register which was assigned to the data to be used by each input operand in all the intermediate texts to their intermediate texts, storing the information regarding correspondence relations between said data and said register in said register management table, and then reading those intermediate texts in the reverse sequence of an execution sequence; when the information regarding correspondence relations between data and register with respect to data to be used in an output operand in the intermediate texts which were read sequentially was registered in said register management table, assigning said register to said data as is, and adding the information regarding said register to said intermediate text; when the information regarding the correspondence relation between data and register with respect to data to be used in an output operand in the intermediate texts which were read sequentially is not registered in said register management table, assigning a register which is not in use or a register which is not used frequently to said data, adding the information regarding said register to said intermediate text, and storing the information regarding correspondence relations between said data and said register in said register management table.

36. A program recorded on a recording medium according to claim 30, wherein said register selecting step comprises:

assigning said register to said data as is, adding the information regarding said register to said intermediate text, and storing the information regarding correspondence relations between said data and said register in said register management table when it is determined that there exists a register which is already assigned to data to be used in any of a plurality of input operands in the intermediate texts which were read sequentially and that said register can be used in the location of said input operand in said intermediate text in said operand location relocating step.

37. A program recorded on a recording medium according to claim 36, wherein said register selecting step comprises:

assigning a register which is not in use or a register which is not used frequently to said data, adding the information regarding said register to said intermediate text and storing the information regarding correspondence relations between said data and said register in said register management table when a register which already stores said data cannot be assigned to one of data to be used in each input operand in the intermediate texts which were read sequentially in said operand location relocating step.

38. A recording medium, wherein, in addition to the step performed by a computer according to a program recorded on a recording medium according to claim 37, a program executing a register transfer text creating step by a computer to insert an intermediate text for storing said data in a register which is newly assigned in said register selecting step immediately before said intermediate text when a register which is not in use or a register which is not used frequently is assigned to any of the data to be used in each input operand in each intermediate text in said register selecting step is recorded.

39. A program recorded on a recording medium according to claim 38, wherein said register selecting step comprises:

adding the information regarding a register which was assigned to the data to be used in each input operand in all the intermediate texts to their intermediate texts, storing the information regarding correspondence relations between said data and said register in said register management table, and then reading those intermediate texts in the reverse sequence of an execution sequence; when the information regarding correspondence relations between data and register with respect to data to be used in an output operand in the intermediate texts which were read sequentially was registered in said register management table, assigning said register to said data as is and adding the information regarding said register to said intermediate text; when the information regarding correspondence relations between data and register with respect to data to be used in the output operand in the intermediate tests which were read sequentially is not registered in said register management table, assigning a register which is not in use or a register which is not used frequently to said data, adding the information regarding said register to said intermediate text, and storing the information regarding correspondence relations between said data and said register in said register management table.

* * * * *